May 1, 1962 E. E. PRATHER 3,031,850
POWER ASSISTED ACTUATOR
Original Filed Jan. 7, 1955 3 Sheets-Sheet 3

INVENTOR.
EDWIN E. PRATHER
BY Cecil F. Arenz
ATTORNEY

United States Patent Office 3,031,850
Patented May 1, 1962

3,031,850
POWER ASSISTED ACTUATOR
Edwin E. Prather, South Bend, Ind., assignor to The Bendix Corporation, a corporation of Delaware
Continuation of abandoned application Ser. No. 480,575, Jan. 7, 1955. This application Feb. 10, 1958, Ser. No. 714,671
12 Claims. (Cl. 60—54.6)

This invention relates to improvements in power assisted hydraulic brake control systems for automotive vehicles, and is a continuation of application Serial Number 480,575, filed January 7, 1955, now abandoned.

In power assisted braking systems utilizing a pressure-differential generally created by the vacuum of the engine intake manifold, in the event of engine failure or "no power conditions" wherein power assistance is unavailable, it is imperative from the standpoint of safety that a manual braking system be available which operates efficiently, requiring a minimum pedal effort to obtain optimum braking conditions. Most power assisted actuators incorporate a constant area plunger in the master cylinder, which when power assistance is unavailable requires an increase of operator effort at the brake pedal to deliver a predetermined amount of fluid to the brake system. Generally, in the case of automotive brakes, it is necessary that the brake shoes be first moved outwardly until they engage the brake drum, at which time they will begin to do the work for which they were intended. The initial movement of the shoes take up the shoe to drum clearance without performing any braking action.

The amount of force required to move the shoes into contact with the drum is relatively small, though the actual movement of the shoes may be a considerable amount. For the first movement of the shoes, therefore, a relatively large amount of hydraulic fluid is required, and this may be at a relatively low pressure; whereas after the shoes have engaged the drum, the movement of the shoes is quite small but a considerable force must be exerted, and therefore a small amount of hydraulic fluid under a relatively high pressure is required. While all of the fluid might be supplied to the brake shoe operating mechanism at a relatively high pressure, this is unnecessary and at times even undesirable.

When power assistance is available there is generally no problem involved in regard to the pressure at which the fluid will be delivered to actuate the brake shoes inasmuch as any extra effort required will be supplied through the medium of the pressure differential created by the aforementioned vacuum created by the intake manifold. However, when power assistance is unavailable, it has been found preferable to provide two rates of flow of hydraulic fluid to the brake operating cylinders or servo-mechanism, the first flow being of a relatively large quantity of fluid at a relatively low pressure to move the brake shoes into engagement with the brake drums, and then to provide a relatively small flow of fluid at a relatively high pressure. In this way the operator is better able to "feel" the action of the brakes, at "no power conditions" and an excessively large movement of the brake pedal is not necessary.

In operation, the amount of fluid at relatively low pressures necessary to move the shoes into contact with the brake drum will vary as the brake shoes wear. The amount of low pressure fluid necessary to charge the brake operating mechanism, as distinguished from the high pressure fluid necessary to apply the brakes, will thus vary so that a device which always delivers a constant amount of charging fluid before delivering the operating fluid may at times prove unsatisfactory.

Therefore a primary object of this invention is to provide in a power assisted braking system a master cylinder which will furnish during brake actuation at a "no power" condition, a charge of fluid under relatively low pressure and of sufficient volume to take up "shoe to drum" clearances, and thereafter supply a lesser volume of fluid at a higher pressure to insure optimum brake performance.

A further object of this invention is to provide a master cylinder in a power assisted brake system which, during brake actuation at "no power" conditions, will compensate for changing volumetric requirements of the brake system to enable optimum manual actuation of the brake system and necessitate a minimum of pedal effort.

Another object of this invention is to provide in a braking system incorporating a power assisted actuator a master cylinder for making available under "power" condition a constant plunger displacement area, and under "no power" condition a variable plunger displacement area, depending upon volumetric requirements of the brake system.

It is still further object of this invention to provide in a power assisted brake system, a secondary manually operated brake system which is simple and efficient, requiring the minimum of effort to obtain optimum braking conditions.

The foregoing and other objects and advantages of the invention will be apparent from the following detailed description considered in connection with the accompanying drawings, submitted for the purpose of illustration and not intended to define the scope of invention, reference being had for that purpose to the subjoined claims.

In the drawings, wherein similar reference characters refer to similar parts throughout the several views.

Figure 1:
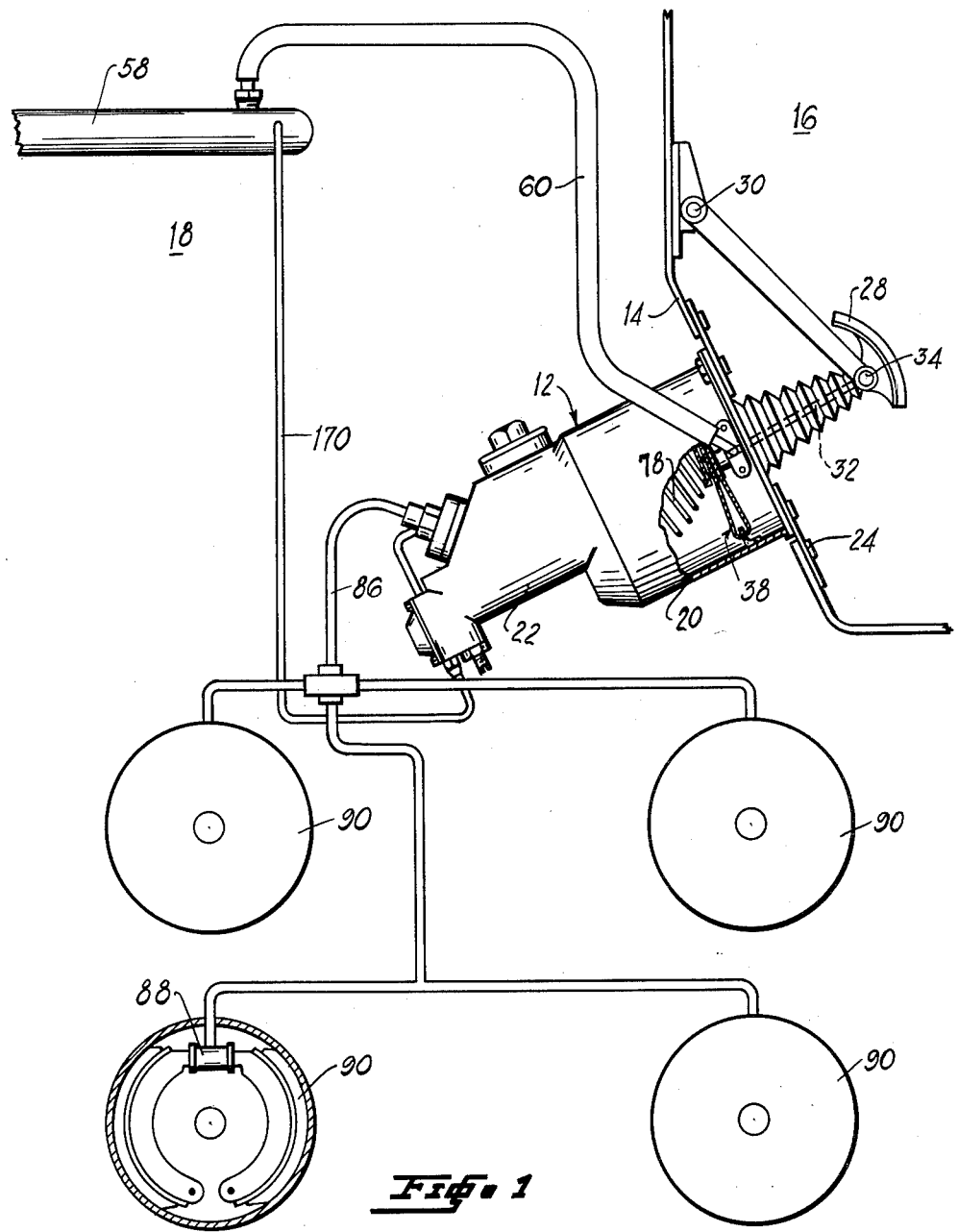
FIGURE 1 is a schematic view of a combined manual and power-assisted hydraulic braking system showing the power actuator partially broken away.

Referring to the drawings and more particularly to FIGURE 1, a power-assisted actuator unit 12 is secured directly to the engine compartment side of a toe-board 14. The toe-board forms the slanting lower portion of the fire wall which separates the driver's compartment 16 from the engine compartment 18. The power-assisted actuator 12 includes a power cylinder 20 and a hydraulic pressure cylinder 22 mounted on the end of the power cylinder. The power cylinder casing may be secured by means of fastening members 24, to the toe-board or any other part of the vehicle.

Figure 2:
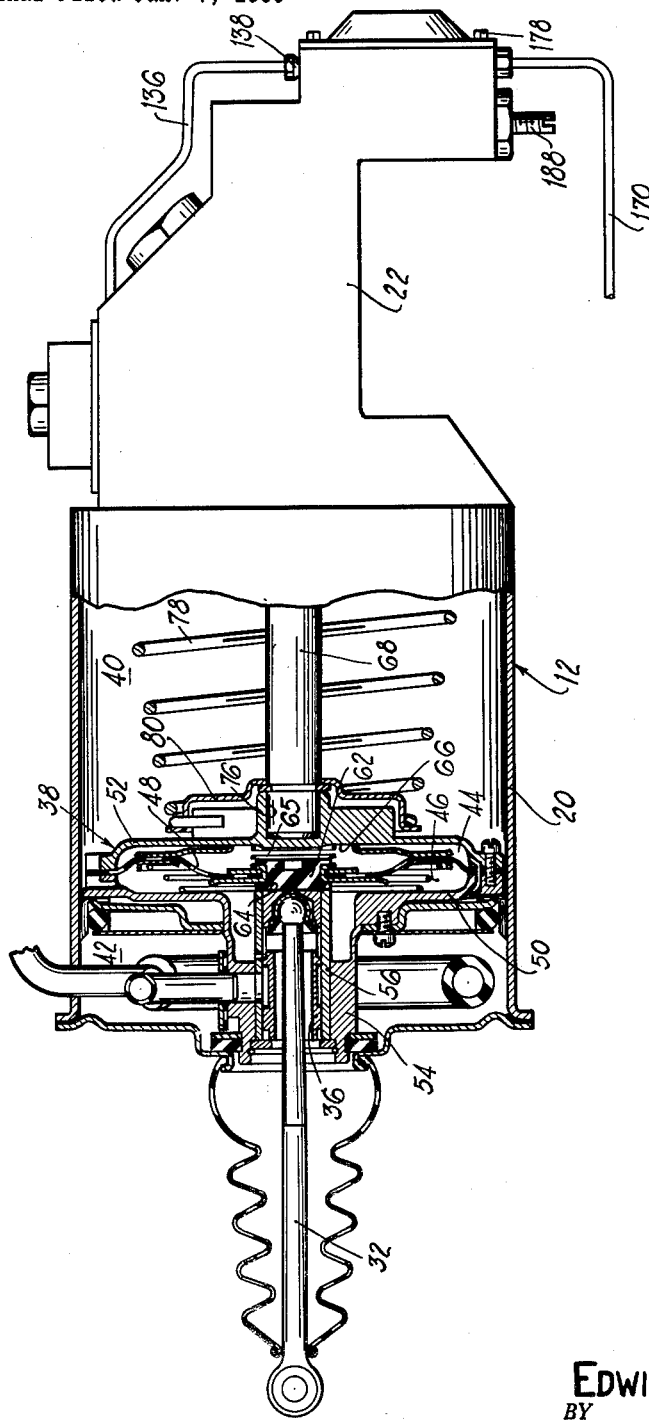
FIGURE 2 is an enlarged longitudinal sectional view, partially in plan showing the valve structure of the power actuator.

The power assisted actuator 12 is controlled by a treadle 28, which is pivoted at 30 on the driver's compartment side of the fire wall. The treadle may be pivoted at its lower end, similarly to a conventional accelerator treadle, if preferred. A control rod 32 is pivotally connected at 34 to the treadle 28, and extends into the power-assisted actuator to control its operation. As shown in FIGURE 2, the right hand end of rod 32 operatively engages a valve control member or plunger 36. Reciprocably received in cylinder 20 is a power piston or pressure responsive movable wall 38 which defines in said cylinder two variable volume chambers 40 and 42. This piston 38 is provided with an internal cavity which is divided into compartments 44 and 46 by means of a pressure responsive diaphragm 48. The piston 38 is comprised of two plates 50 and 52 peripherally joined together in any suitable manner. Communication passages are provided between chamber 40 and compartment 46 and rear chamber 42 and front compartment 44. The plate member 50 includes an integral rearwardly extending portion 54 which supports a sleeve member 56 in which the control plunger 36 is slidably received. Control plunger 36 and sleeve member 56 include cooperating lands and control ports to form a slide valve for controlling pressure differential across the power piston 38 which is effective to act on the diaphragm member 48 to apprize the operator of the braking effort. The aforementioned structure is described in detail in the copending application of Earl R. Price, Serial No. 411,386, filed February 19, 1954, now Patent No. 2,818,710. It should be noted that the control valve and reaction structure referred to in application Serial No. 411,386 forms no part of the present invention and could readily be replaced by other control valves and reaction structure.

Any desired type of differential fluid pressure power device may be used, and the unit may be either "atmosphere-suspended" or "vacuum-suspended." In this instance an "atmosphere-suspended" unit is disclosed wherein the necessity for sealing off chamber 42 and compartment 44 from the atmosphere is obviated.

The valve control plunger 36 respectively controls the communication of compartment 46 (hence also chamber 40) with either the atmosphere in chamber 42, or a source of vacuum, such as the usual intake manifold 58. The intake manifold 58 is in communication with slide valve structure by means of a conduit 60.

The diaphragm member 48 includes a centrally located cushioning button 62 which is held in engagement with the right end 64 of the control plunger 36 by means of a coiled spring 65 interposed between the cushioning button 62 and the inner wall 66 of the piston plate portion 52.

A pressure of force transmitting member 68 projects through an opening 70 in the end 72 of cylinder 20 and extends into the pressure chamber 74. The power piston plate member 52 is provided with a centrally located socket 76 which supports the left end of the force transmitting member 68. The piston 38 is urged toward a released position by means of a spring 78 interposed between the front end 72 of the power cylinder 20 and a retainer ring 80 suitably secured to the left end of force transmitting member 68. The retainer ring 80 overlies and is urged in the direction of centrally located socket 76. Thus the force of spring 78 is transmitted to piston 38 through the intermediary of the left end of rod 68.

A suitable seal assembly 82 is provided on member 68 in pressure chamber 74 to prevent leakage between chamber 74 and chamber 40.

The hydraulic pressure cylinder 22 is provided with an outlet port 84 through which the fluid pressure created in pressure chamber 74 is communicated through conduit 86 to brake wheel cylinders 88 (only one being shown) to actuate the brake shoe assemblies 90. A fluid reservoir 92 replenishes and compensates the hydraulic system with fluid. The reservoir 92 is in communication with the pressure chamber 74 via outlet 94 in which a valve 96 is located. The valve 96 includes a depending stem 98 projecting into the interior of chamber 74 where it is engaged by a flange 100 secured in any suitable manner on the end portion of the thrust transmitting member 68 which extends into chamber 74. When the thrust transmitting member is urged to its leftmost position under the action of spring 78, the flange member 100 will normally contact the stem 98 tilting the valve off its seat and permitting communication between reservoir 92 and the interior of pressure chamber 74. Contained in the outlet 84 between the brake assemblies and the pressure chambers 74 is a suitable residual check valve 102 for maintaining a residual line pressure in the brake system.

The structure heretofore described is substantially that disclosed in the previously mentioned Price application and does not per se constitute applicant's invention.

Figure 3:
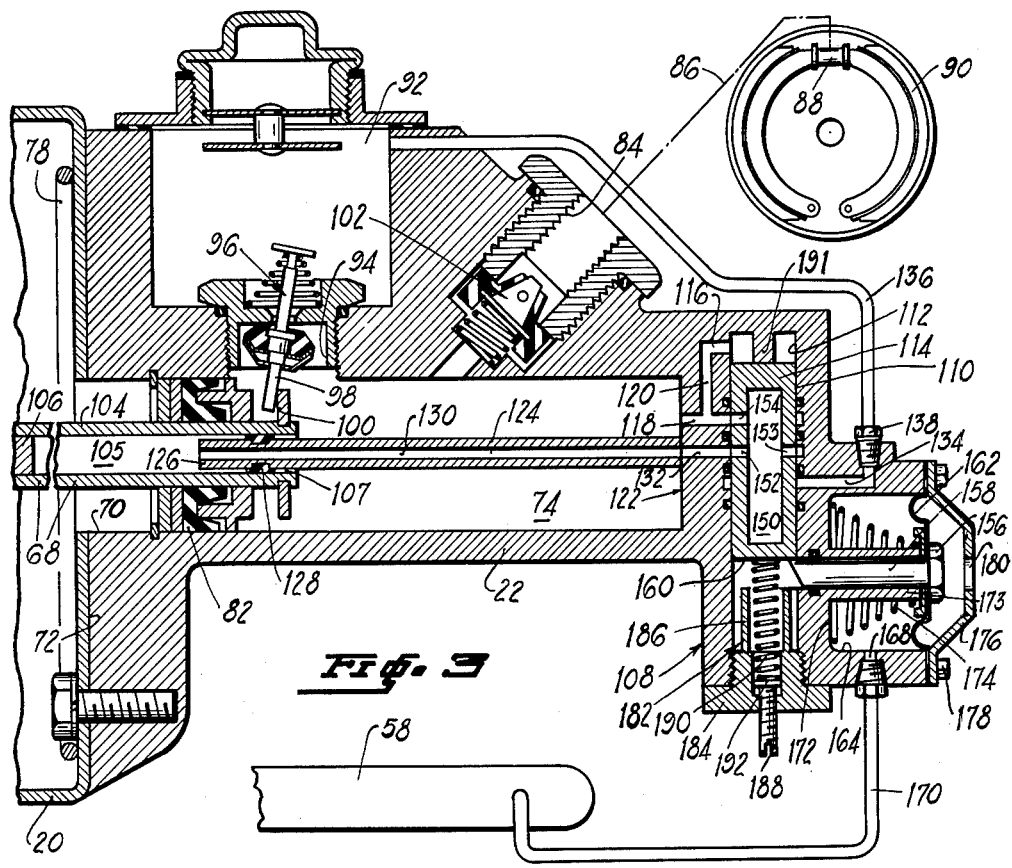
FIGURE 3 is a further enlarged partial longitudinal sectional view of the novel master cylinder structure when power assistance is available.
Figure 4:
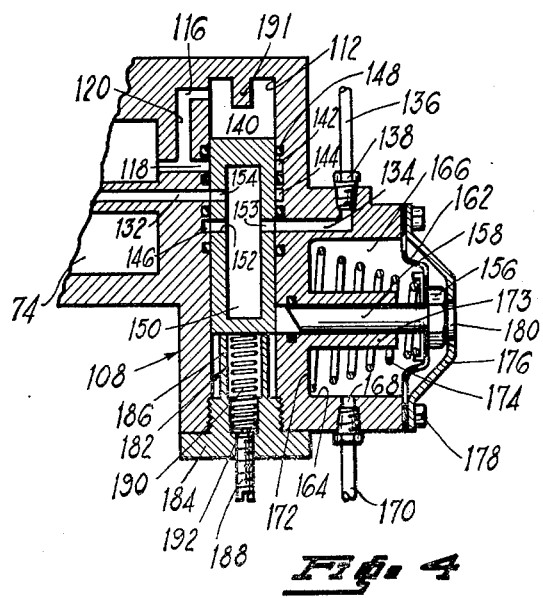
FIGURE 4 is a fragmentary view of the novel master cylinder structure similar to that of FIGURE 3, during "no power" conditions wherein power assistance is unavailable.

As clearly seen in FIGURES 3 and 4 the thrust transmitting member may be characterized as a volumetric plunger which, when moved to the right, will tend to decrease the volume in pressure chamber 74 of cylinder 22 thereby providing means for pressurizing any hydraulic fluid contained in chamber 74 which will be directed to the brake cylinders as previously mentioned.

The thrust transmitting member 68 has an end 104 of tubular construction which extends into the chamber 74. A fluid chamber 105 is formed within the tubular portion 104 to which the flange 100 is secured. The tubular portion forming the chamber 105 is closed by end wall 106 and open at 107. As viewed in FIGURE 3, fluid displacement in chamber 74 due to the rightward movement of force transmitting member 68 can be said to be substantially equal to the distance the thrust transmitting member 68 is moved into chamber 74 (or length of stroke) times the cross-sectional areas of end wall 106 and that of the tubular end portion or annulus 104. Thus it may be said that the force transmitting member includes two effective displacement portions constituted by the cross-sectional areas of chamber 105 (this being the same as the area of end wall 106) and that of annular or tubular portion 104.

A valve housing 108 is located at one end of the power cylinder 20; said valve housing containing valve structure 110 which is operable to permit fluid displacement by both displacement portions of the force transmitting member 68, i.e. the effective cross-sectional areas of end wall 106 and tubular portion 104 during "power-on" condition, and sequential fluid displacement by said displacement portions during "power-off" conditions.

The housing 108 is provided with a bore 112 in which a hollow cylindrical valve plunger member 114 is reciprocably received. Formed in housing 108 in communication with bore 112 and pressure chamber 74 are passages 116 and 118 connected by a passage 120. Integral with or otherwise suitably secured to the inner wall 122 of pressure chamber 74 is a tubular rod member 124 having a free end 126 which is slidably disposed in chamber 105 of the force transmitting member 68. A suitable seal means 128 is provided on the exterior of rod 124 contained in chamber 105 to prevent leakage between chambers 105 and 74. Tubular rod member 124 has an internal passage 130 in communication with a passage 132 in the valve housing 108 and permits communication between chamber 105 and bore 112 of the valve housing. Thus it can be readily seen that rightward movement of the force transmitting member 68 causes fluid to be displaced by the effective cross-sectional area of end wall 106 through passage 130 into the bore 112 of the valve housing member.

Housing 108 includes an additional internal passage 134 which connects the bore 112 with conduit 136 at 138 to permit transmittal of fluid therethrough to the reservoir 92.

As shown in FIGURE 4, a pressure chamber 140 is formed in the housing member 108 at one end of the valve plunger 114. The chamber 140 communicates with the chamber 74 via passages 116, 118, and 120. The valve bore 112 includes annular channels 142, 144, and 146 in communication with passages 118, 132, and 134, respectively, in the position shown in FIGURE 4. Suitable seal means 148 are included on each side of the aforementioned annular chambers to prevent fluid pressure leakage therebetween in bore 112 past valve plunger 114.

The valve plunger 114 includes a hollow center chamber 150 having spaced radially extending passages 152, 153, and 154; passages 153 and 154 being diametrically opposite each other. In the position shown in FIGURE 3, passages 152, and 154 are in communication with passages 132 and 118, respectively and fluid through passage 153 is blocked off by channel 144. The valve plunger, as shown in FIGURE 4, reciprocates to permit passage 154 to be in communication with passage 132, and passage 153 to communicate with passage 134, thus providing a connection for the interior of chamber 105 through passage 130 to the fluid reservoir 92.

Reciprocable movement of valve plunger 114 is prevented during "power-on" conditions by a pressure responsive controlled stop assembly 156. The stop assembly includes a rod or stop member 158 positioned transversely to the valve bore 112 and operable to engage the lower portion 160 of the valve plunger 114, which when engaged therewith assures alignment of passages 152 and 154 with passages 132 and 118, respectively.

Secured to the stop member 158 in any suitable manner is a pressure responsive diaphragm member 162 which forms with an annular recess portion 164 of the housing member 108 adjacent to the valve bore 112 a compartment 166. The compartment 166 includes a passage 168 connected to a conduit 170 which is in communication with the intake manifold 58, as shown in FIGURES 1 and 3. Interposed between the diaphragm 162 and the opposite wall 172 of the compartment 166 is a spring 174 which urges the stop member 158 toward the right or away from engagement with a valve plunger 114. Wall 172 includes an integral tubular extension 173 which serves as a stop for plunger 158 to prevent excessive leftward movement in the position shown in FIGURE 3 as well as a support for plunger 158. The diaphragm 162 is secured about its periphery by means of a cap member 176 held in place by means of screws 178, for example. The cap member 176 contains an aperture 180, thus permitting atmospheric pressure to be available on the side of the diaphragm opposite compartment 166 at all times.

Contained in the end of valve bore 112 opposite chamber 140 is a valve plunger adjusting and stop assembly 182. This assembly consists of a bushing member 184 which is threaded into the bore 112 and includes a tubular extension 186 which is of a predetermined length to establish alignment between the passage 154 and the passage 132 when the plunger 114 is in the position shown in FIGURE 4. An adjusting screw 188 is centrally threaded into the bushing 184. A spring 190 is interposed between the lower portion 160 of the valve plunger 114 and the internal end 192 of the adjusting screw 188, biasing the plunger against stop 191.

The stop member 158 by virtue of its connection with diaphragm 162 is urged toward the left to the extent permitted by stop 173, into an abutting position with the plunger 114 when a source of vacuum is available from the intake manifold. In the event of power failure or loss of a source of vacuum, the spring 174 urges the stop member 158 into contact with cap member 176, as seen in FIGURE 4, out of engagement with the lower portion 160 of the plunger 114, thus permitting the plunger to move downwardly in the bore 112. However, downward movement of the plunger 114 is prevented by the spring 190 which retains the plunger in the position illustrated in FIGURE 3 until sufficient pressure is created in chamber 140 to overcome the force of spring 190.

Operation of the device of the invention during "power-on" conditions is as follows:

Attention is now directed to the position of the structure disclosed in FIGURE 3 of the drawing wherein the position of the parts are shown when a source of vacuum is available. Depression of the treadle 28 will cause relative movement between valve plunger 36 and valve sleeve 56 causing a pressure differential across the power piston 38. Inasmuch as vacuum source is available during "power-on" conditions a pressure differential will exist at this time across the diaphragm 162 urging the stop member 158 into its illustrative position in abutment with the lower portion 160 of the valve plunger 114 but prevented by tubular extension 173 from striking spring 190. With the development of a pressure differential across power piston 38 movement of the force transmitting member 68 into the pressure chamber 74 is accomplished. The resulting movement of the force transmitting member causes fluid to be displaced by the effective displacement portions of the cross-sectional area of end wall 106 and the cross-sectional area of the tubular portion 104. The fluid displaced by the effective portion of 104 is pushed out the outlet 84 and to the wheel cylinders 88 of the brake system. Simultaneously fluid from this effective portion of the force transmitting member is urged through passage 118, 120, and 116 to chamber 140 and is effective to tend to urge the plunger 114 to a downward position. However, inasmuch as stop member 158 is in engagement with the lower portion 160 of the plunger member 114 this pressure existing in chamber 140 causes no movement of the valve plunger. At the same time, the effective displacing portion of end wall 106 causes fluid to be urged through passage 130, 132, and 152 into the internal chamber 150 of plunger member 114 out of passage 154 through passage 118 and thence out of passage 84 to the wheel cylinders 88. Thus in the position illustrated in FIGURE 3, the entire effective displacement portion of the force transmitting member 68 is effective to transmit fluid pressure to the brake system.

Operation during "power-off" conditions is as follows:

During a "power-off" condition, see FIGURE 4, wherein a source of vacuum is unavailable, actuation of the treadle 28 and movement of the plunger 36 therewith causes the member 62 to be urged into contact with the inner wall 66 of power piston 38 and any fluid displacement in the brake system is accomplished only by the physical effort imposed by the operator of the brake system. At this time, since there is no vacuum in chamber 166 the spring 174 is effective to urge the stop member 158 toward the right into contact with the inner side of cap 176 and out of contact with the lower portion 160 of the valve plunger 114. However, the spring 190 is of sufficient strength to urge the valve plunger passages 152 and 154 into alignment with passages 132 and 118, respectively, to permit the passage of fluid in the manner described during "power-on" conditions.

During initial brake actuation wherein a relatively low pressure is required to take up brake-to-drum clearances, the low pressure is insufficient to build up a pressure in chamber 140 to cause the plunger 114 to move downwardly against the stop member 186. During this first stage, fluid is displaced by both effective portions of the end wall 106 and the effective cross-sectional portion of tubular member 104 until the brake system demands a relatively higher pressure to be exerted at the brake cylinders to cause deceleration of the vehicle. With the demand for a higher pressure and a comparable demand for an increased output of physical effort on the operator's part, comes an increase of fluid pressure in chamber 140 causing the plunger 114 to move downwardly, overcoming the force of spring 190 and at this time passage 154 becomes aligned with passage 132. Fluid displaced by the effective cross-sectional area of end wall 106 is then directed out passage 130, through passage 132, and through passage 154 into the compartment 150. Inasmuch as plunger 114 has moved downwardly, passage 152 is now in alignment with passage 134 which communicates with the fluid reservoir 92 and thus fluid displaced by the effective displacement area of end wall 106 is directed to the fluid reservoir.

Release of pressure on the treadle 28 by the operator results in the removal of pressure in chamber 140 and thus spring 190 will be effective to urge plunger 114 back to the position disclosed in FIGURE 3. When a power source is again available, the pressure differential will become available across diaphragm 162 and will be sufficient to overcome spring 174 and urge the stop member 158 into engagement with the lower portion 160 of valve plunger 114.

Thus it can be seen that the power assisted brake system is provided with an alternative brake system during "power-off" conditions wherein pressure cylinder-valve-compounding structure permits fluid displacement to a brake system depending upon volumetric requirements of the brake system.

Although a particular embodiment of the invention has been illustrated and described other changes and modifications will be apparent to those skilled in the art. All changes and modifications falling within the scope of the claims are intended to be claimed.

I claim:

1. In an automotive hydraulic braking system and the like: a driven fluid pressure motor; first and second fluid displacement means; servomotor means for simultaneously actuating said first and second fluid displacement means; a power source for operating said servomotor; means for simultaneously actuating said first and second fluid displacement means by manual force when power is not available to actuate said servomotor means; exhaust passage means for receiving fluid from said first fluid displacement means at a low pressure; valve means having a movable element which when in a first position closes off said exhaust passage means from said first fluid displacement means while communicating said first displacement means to said driven fluid pressure motor, and when in a second position closes off said first fluid displacement means from said driven fluid pressure motor while communicating said first fluid displacement means to said exhaust passage means; means for moving said movable element from said first to said second position when the pressure in one of said displacement means exceeds a predetermined value; and fluid pressure motor means operated by said power source for holding said movable element in said first position when power is available to operate said servomotor means.

2. In an automotive hydraulic braking system and the like: first and second fluid displacement means; servomotor means for simultaneously actuating said first and second fluid displacement means; a power source for operating said servomotor; means for simultaneously actuating said first and second fluid displacement means by manual force when power is not available to actuate said servomotor means; exhaust means for receiving fluid from said first fluid displacement means at a low pressure; first valve porting means for communicating fluid from said first fluid displacement means to a driven fluid pressure motor when the pressure in said first fluid displacement means is at least as great as the pressure in said second fluid displacement means; and second valve porting means having a movable element which when in a first position closes off said first fluid displacement means from said exhaust means and when in a second position communicates said first fluid displacement means to said exhaust means; means for holding said movable element in said first position when the pressure in said second fluid displacement means is below a predetermined value and for moving said movable element to said second position when the pressure in said second fluid displacement means exceeds said predetermined value; and a fluid pressure motor communicating with said power source for holding said movable element in said first position when power is available to actuate said servomotor means.

3. In an automotive hydraulic braking system and the like: first and second fluid displacement means; servomotor means for simultaneously actuating said first and second fluid displacement means; a power source for operating said servomotor; means for simultaneously actuating said first and second fluid displacement means by manual force when power is not available to actuate said servomotor means; exhaust means for receiving fluid from said first fluid displacement means at a low pressure; first valve porting means for communicating fluid from said first fluid displacement means to a driven fluid pressure motor; second valve porting means having a movable element which when in one position closes off said first fluid displacement means from said exhaust means and which when in a second position opens communication to said exhaust means; said first valve porting means being constructed and arranged so that it is closed when fluid passes out through said second valve porting means; fluid pressure motor means for moving said movable element from its first position to said second position when the pressure in said second fluid displacement means exceeds a generally predetermined level; and fluid pressure motor means controlled by said power source for holding said movable element in its first position when power is available to actuate said servomotor means.

4. In an automotive hydraulic braking system and the like: first and second fluid displacement means; servomotor means for simultaneously actuating said first and second fluid displacement means; a power source for operating said servomotor; means for simultaneously actuating said first and second fluid displacement means by manual force when power is not available to actuate said servomotor means; exhaust means for receiving fluid from said first fluid displacement means at a low pressure; first valve porting means for discharging fluid from said first fluid displacement means into the discharge of said second fluid displacement means; second valve porting means having a movable element which when in one position closes off said first fluid displacement means from said exhaust means and which when in a second position opens communication to said exhaust means; said first valve porting means being constructed and arranged so that it is closed when said second valve porting means is opened; fluid pressure motor means for moving said movable element from its first position to said second position when the pressure in said second fluid displacement means exceeds a generally predetermined level; stop means which when in one position permits said movable element to move from its first position to its second position and which stop means when in a second position holds said movable element in its first position; and fluid pressure motor means for holding said stop means in its second position when power is available to actuate said servomotor means.

5. In an automotive hydraulic braking system and the like: first and second fluid displacement means each having a discharge port; servomotor means for simultaneously actuating said first and second fluid displacement means; a power source for operating said servomotor; means for simultaneously actuating said first and second fluid displacement means by manual force when power is not available to actuate said servomotor means; exhaust means for receiving fluid at a low pressure; valve means connected to the discharge port of said first fluid displacement means, said valve means having a control element which when in one position communicates said discharge port of said first fluid displacement means to an outlet port for actuating a driven fluid pressure motor, and which when in a second position communicates said discharge port to said exhaust means; fluid pressure means actuated by pressure from said second fluid displacement means for moving said control element from said first position to said second position when the pressure in said second fluid displacement means exceeds a generally predetermined pressure; and means for holding said control element in said first position when power is available to actuate said servomotor means, and for permitting said control element to be moved to its second position when power is not available to actuate said servomotor means.

6. In an automotive hydraulic braking system and the like: first and second fluid displacement means each having a discharge port; servomotor means for simultaneously actuating said first and second fluid displacement means; a power source for operating said servomotor; means for simultaneously actuating said first and second fluid displacement means by manual force when power is not available to actuate said servomotor means; exhaust means for receiving fluid at a low pressure; valve means connected to the discharge port of said first fluid displacement means, said valve means having a control element which when in one position communicates said discharge port of said first fluid displacement means to the discharge of said second fluid displacement means, and which when in a second position communicates said discharge port to said exhaust means; fluid pressure means actuated by pressure from said second fluid displacement means for moving said control element from said first position to said second position when the pressure in said second fluid displacement means exceeds a generally predetermined pressure; and means for holding said control element in said first position when power is available to actuate said servomotor means, and for permitting said control element to be moved to its second position when power is not available to actuate said servomotor means.

7. In an automotive hydraulic braking system and the like: first and second fluid displacement means each having a discharge port; servomotor means for simultaneously actuating said first and second fluid displacement means; a power source for operating said servomotor; means for simultaneously actuating said first and second fluid displacement means by manual force when power is not available to actuate said servomotor means; exhaust means for receiving fluid at a low pressure; valve means connected to the discharge port of said first fluid displacement means, said valve means having a control element which when in one position communicates said discharge port of said first fluid displacement means to said second fluid displacement means, and which when in a second position communicates said discharge port to said exhaust means; fluid pressure means actuated by pressure from said second fluid displacement means for moving said control element from said first position to said second position when the pressure in said second fluid displacement exceeds a generally predetermined pressure; stop means which when in one position permits said movable element to move from its first position to its second position and which stop means when in a second position holds said movable element in its first position; and fluid pressure motor means for holding said stop means in its second position when power is available to actuate said servomotor means.

8. In an automotive hydraulic braking system and the like: first and second fluid displacement means each having a discharge port; servomotor means for simultaneously actuating said first and second fluid displacement means; a power source for operating said servomotor; means for simultaneously actuating said first and second fluid displacement means by manual force when power is not available to actuate said servomotor means; exhaust means for receiving fluid at a low pressure; valve structure having a cylindrical bore therein with a movable slide valve in sealing engagement with the side walls of said bore, said slide valve having porting which when in one position adjacent one end of said valve bore communicates said discharge port of said first fluid displacement means to said second fluid displacement means, and which when in a second position communicates said discharge port to said exhaust means; spring means biasing said slide member toward said one end of said valve bore; fluid passage means communicating fluid pressure from said second fluid displacement means to said one end of said valve bore; stop means which when in one position permits said slide member to move from its first position to its second position and which stop means when in a second position holds said slide member in its first position; and fluid pressure motor means for holding said stop means in its second position when power is available to actuate said servomotor means.

9. In an automotive hydraulic braking system and the like; a body member having a fluid pressurizing chamber therein; a tubular fluid displacement member projecting into one end of said fluid pressurizing chamber; a tubular plunger member projecting from the other end of said fluid pressurizing chamber into the internal chamber of said tubular fluid displacement member to displace fluid therefrom through said plunger member; servomotor means for forcing said tubular fluid displacement member into said fluid pressurizing chamber over said plunger member; a power source for operating said servomotor; means for forcing said tubular fluid displacement member into said fluid pressurizing chamber over said plunger member by manual force when power is not available to actuate said servomotor means; exhaust means for receiving fluid at a low pressure; first valve porting means for communicating fluid discharged from said tubular plunger to said fluid pressurizing chamber, second valve porting means having a movable element which when in one position closes communication from the inside of said tubular plunger member to said exhaust means and which when in a second position opens communication to said exhaust means; said first valve porting means being constructed and arranged so that it is closed when fluid passes out through said second valve porting means to said exhaust means; fluid pressure motor means for moving said movable element from its first position to said second position when the pressure in said fluid pressurizing chamber exceeds a generally predetermined level; stop means which when in one position holds said movable element in its said one position, and which stop means when in a second position permits said movable element to move from its first position to its second position; and fluid pressure motor means for holding said stop means in its first position when power is available to actuate said servomotor means.

10. In an automotive hydraulic braking system and the like; a body member having a first fluid pressurizing chamber therein; a tubular fluid displacement member projecting into one end of said fluid pressurizing chamber; a tubular plunger member projecting from the other end of said fluid pressurizing chamber into the internal chamber of said tubular fluid displacement member; servomotor means for forcing said tubular fluid displacement member into said fluid pressurizing chamber; a power source for operating said servomotor; means for forcing said tubular fluid displacement member into said fluid pressurizing chamber by manual force when power is not available to actuate said servomotor means; exhaust means for receiving fluid at a low pressure; a cylindrical valve bore in said body member having a slide member in sliding sealing engagement with the side walls of said bore, said slide member having suitable passages therein for communicating the inside of said tubular plunger member to said fluid pressurizing chamber when said slide member is in a first position adjacent one end of said cylindrical valve chamber and for communicating the inside of said tubular plunger member to said exhaust means when said slide member is in a second position away from said end of said cylindrical valve bore; spring means biasing said slide member towards said one end of said valve bore; fluid passage means communicating said fluid pressurizing chamber to said one end of said cylindrical valve bore; stop means which when in one position holds said slide member in its said one position, and which stop means when in a second position permits said slide member to move from its first position to its second position; and fluid pressure motor means for holding said stop means in its first position when power is available to actuate said servomotor means.

11. In a force transmitting system for actuating brakes and the like: a manually actuatable driving member and a driven member; force transmitting means for transmitting force from said driving member to said driven member, said force transmitting means having a first condition for transmitting force to said driven member with a low mechanical advantage, and a second condition for transmitting force to said driven member with a high mechanical advantage; a servomotor for applying force to said driving member, said servo-motor being adapted to be powered by a fluctuatable source of power; control means which when in a normal condition causes said force transmitting means to be in its first condition and which when a predetermined force is applied through said force transmitting means shifts said force transmitting means to its second condition; and motor means adapted to be actuated by said power source for said servomotor, said motor means holding said control means in its normal position and preventing said force transmitting means from moving to its second condition when the energy level of said power source is above a predetermined level and releasing said control means to function normally when said energy level is below said predetermined level.

12. In a fluid pressurizing unit having an outlet connection: first and second fluid displacement means; servomotor means for simultaneously actuating said first and second fluid displacement means, said servomotor being driven by a fluctuatable power source; means for simultaneously actuating said first and second fluid displacement means manually; exhaust passage means for receiving fluid at a low pressure; valve means communicating said first fluid displacement means to said outlet connection when in one condition and communicating said first fluid displacement means to said exhaust passage means when in a second condition; said valve means normally being in its first condition; fluid pressure means for moving said valve means into its second condition when the pressure in said outlet connection exceeds a predetermined pressure; control means for said valve means having a first condition permitting said fluid pressure means to move said valve means to its second condition, and a second condition preventing said fluid pressure means from moving said valve means to its second condition; and motor means adapted for actuation by said power source for said servomotor to move said control means to its second condition when power is available to actuate said servomotor.

References Cited in the file of this patent
UNITED STATES PATENTS

| | | |
|---|---|---|
| 1,084,715 | Steinmann | Jan. 20, 1914 |
| 1,903,973 | Boughton | Apr. 18, 1933 |
| 2,031,360 | Boughton | Feb. 18, 1936 |
| 2,190,238 | Lepersonne | Feb. 13, 1940 |
| 2,331,238 | Schnell | Oct. 5, 1943 |
| 2,402,344 | Price | June 18, 1946 |
| 2,875,582 | Hill | Mar. 3, 1959 |

FOREIGN PATENTS

| | | |
|---|---|---|
| 747,273 | France | Mar. 28, 1933 |